(12) United States Patent
Higham et al.

(10) Patent No.: US 9,092,429 B2
(45) Date of Patent: Jul. 28, 2015

(54) DMA VECTOR BUFFER

(71) Applicant: ANALOG DEVICES TECHNOLOGY, Hamilton (BM)

(72) Inventors: Andrew J. Higham, Edinburgh (GB); Michael S. Allen, Needham, MA (US); John L. Redford, Arlington, MA (US)

(73) Assignee: ANALOG DEVICES GLOBAL, Hamilton (BM)

( * ) Notice: Subject to any disclaimer, the term of this patent is extended or adjusted under 35 U.S.C. 154(b) by 0 days.

(21) Appl. No.: 14/040,367

(22) Filed: Sep. 27, 2013

(65) Prior Publication Data

US 2014/0115195 A1   Apr. 24, 2014

Related U.S. Application Data

(60) Provisional application No. 61/717,564, filed on Oct. 23, 2012.

(51) Int. Cl.
*G06F 3/06* (2006.01)
*G06F 13/28* (2006.01)
*G06F 13/38* (2006.01)

(52) U.S. Cl.
CPC ..................... *G06F 13/28* (2013.01)

(58) Field of Classification Search
None
See application file for complete search history.

(56) References Cited

U.S. PATENT DOCUMENTS

| | | |
|---|---|---|
| 5,247,689 A | 9/1993 | Ewert |
| 5,355,508 A | 10/1994 | Kan |
| 5,471,592 A | 11/1995 | Gove et al. |
| 5,815,680 A | 9/1998 | Okumura et al. |
| 2005/0125636 A1 | 6/2005 | Ford et al. |
| 2006/0090025 A1 | 4/2006 | Tufford et al. |
| 2009/0083524 A1 | 3/2009 | Van Wel |
| 2010/0082894 A1* | 4/2010 | Hsu et al. ................ 711/105 |
| 2011/0022754 A1 | 1/2011 | Cidon et al. |
| 2012/0054379 A1* | 3/2012 | Leung et al. ............. 710/23 |
| 2014/0019719 A1 | 1/2014 | Anand et al. |
| 2014/0115224 A1 | 4/2014 | Sanghai et al. |
| 2014/0115278 A1 | 4/2014 | Redford et al. |
| 2014/0115302 A1 | 4/2014 | Higham et al. |

FOREIGN PATENT DOCUMENTS

EP   2725485   4/2014

OTHER PUBLICATIONS

U.S. Patent Application filed on Aug. 9, 2013, U.S. Appl. No. 13/963,793.
U.S. Appl. No. 14/017,301, filed Sep. 3, 2013.
Response to Extended Search Report in European Application Serial No. EP13187866 filed Oct. 22, 2014, 19 pages.
U.S. Patent Application filed on Dec. 19, 2012, U.S. Appl. No. 13/720,624.
Non-Final Office Action for U.S. Appl. No. 13/720,624 mailed Nov. 24, 2014, 34 pages.

(Continued)

*Primary Examiner* — Scott Sun

(57) ABSTRACT

According to one example embodiment, a direct memory access (DMA) engine and buffer is disclosed. The vector buffer may be explicitly programmable, and may include advanced logic for reordering non-unity-stride vector data. An example MEMCPY instruction may provide an access request to the DMA buffer, which may then service the request asynchronously. Bitwise guards are set over memory in use, and cleared as each bit is read.

20 Claims, 6 Drawing Sheets

(56) References Cited

OTHER PUBLICATIONS

Koren & Krishna, "Fault Tolerant Systems", Part 12, Chapter 4, 2007, Morgan-Kaufman, 11 pages.
Hoffman, Jeff et al., "Architecture of the Scalable Communications Core", Proceedings of the First International Symposium on Networks-on-Chip (NOSC '07), 2007, IEEE, 0-7895-2773-6/07, 10 pages.
Siegel, Howard Jay, "Interconnection Networks for SIMD Machines", Jun. 1979, IEEE, 0018-9162/79/0600-0057800, 75, 9 pages.
English Summary of Preliminary Rejection issued in Korean Patent Application Serial No. 10-2013-126017 mailed Feb. 25, 2015, 3 pages.

* cited by examiner

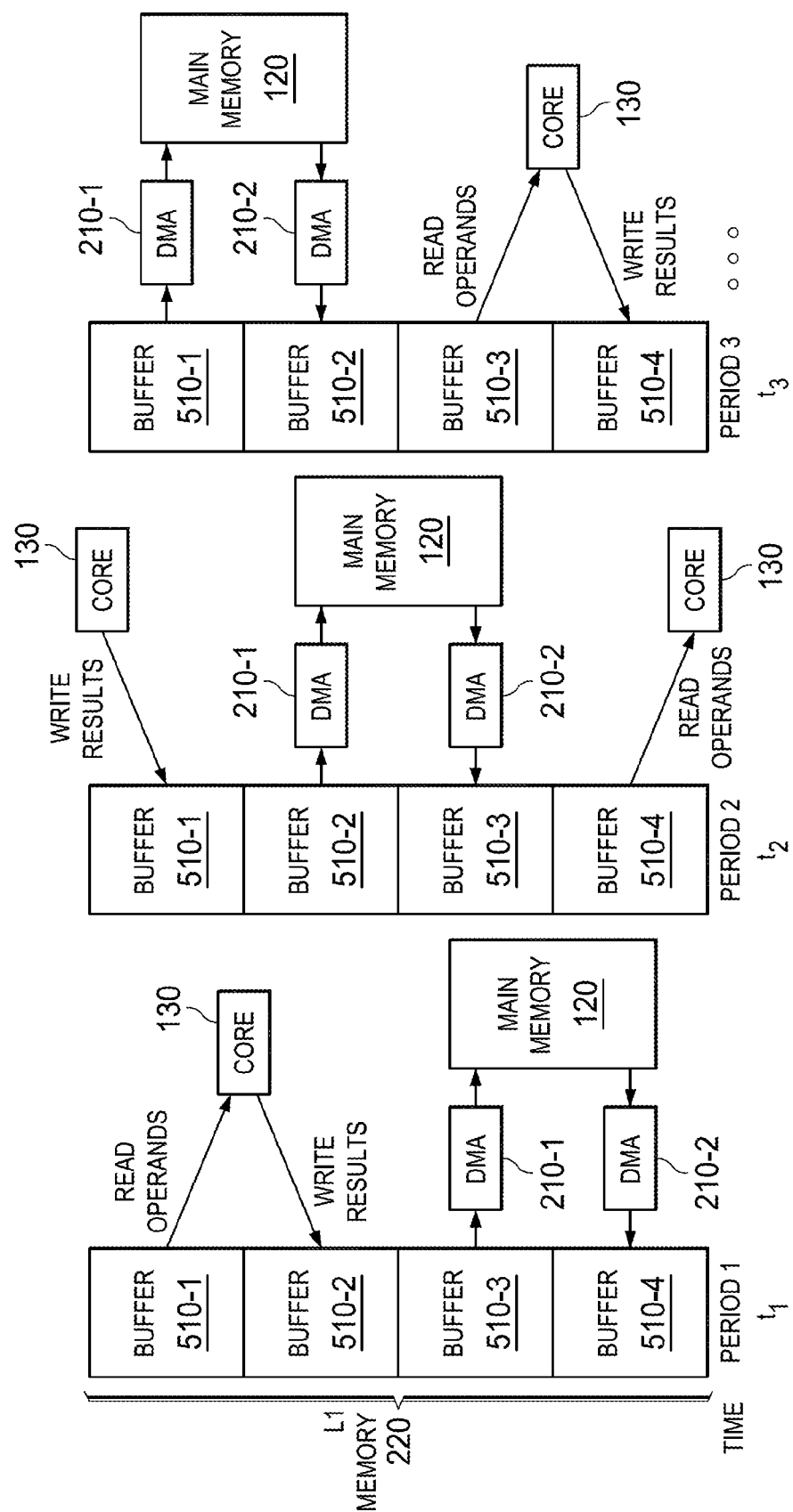

DMA VECTOR BUFFER

CROSS-REFERENCE TO RELATED APPLICATIONS

This application claims priority to U.S. Provisional Application 61/717,564, entitled "Compiler Directed Direct Memory Access (DMA) Vector Buffer," filed Oct. 23, 2012, which is incorporated by reference in its entirety.

TECHNICAL FIELD

The present disclosure relates generally to computer processors and, more particularly, to a direct memory access buffer.

BACKGROUND

Parallel processing is often implemented by a processor to optimize processing applications, for example, by a digital signal processor (DSP) to optimize digital signal processing applications. A processor can operate as a single instruction, multiple data (SIMD), or data parallel, processor to achieve parallel processing. In SIMD operations, a single instruction is sent to a number of processing elements of the processor, where each processing element can perform the same operation on different data.

In vector processing, "stride" refers to the incremental step size of each element, which may or may not be the same as the element size. For example, an array of 32-bit (4 byte) elements may have a stride of 4 bytes, particularly on a processor with a 32-bit data word size. This is referred to as a unity stride. A non-unity stride occurs when one item is accessed for every N elements. For example, with a stride of four, every fourth WORD is accessed.

BRIEF DESCRIPTION OF THE DRAWINGS

The present disclosure is best understood from the following detailed description when read with the accompanying FIGS. It is emphasized that, in accordance with the standard practice in the industry, various features are not drawn to scale and are used for illustration purposes only. In fact, the dimensions of the various features may be arbitrarily increased or reduced for clarity of discussion.

FIG. 5 is a block diagram of example read and write cycles between memory buffers according to various aspects of the present disclosure.

DETAILED DESCRIPTION

Overview

Figure 1:
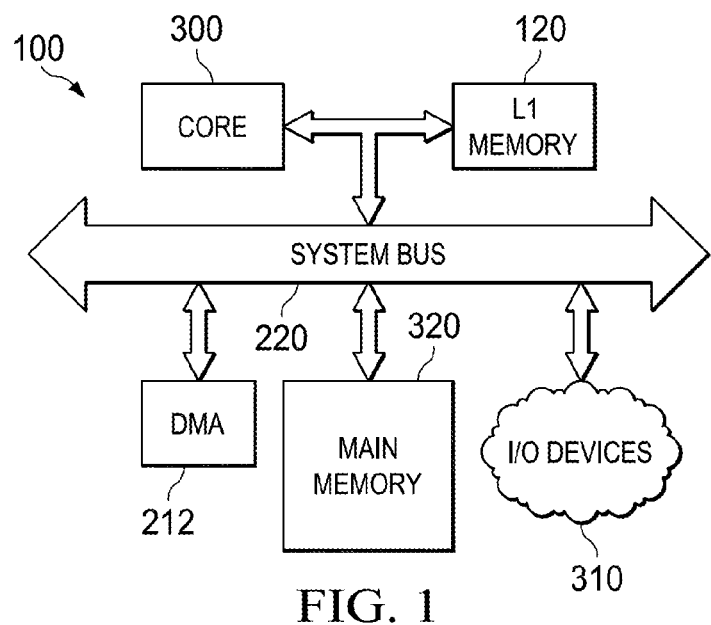
FIG. 1 is a block diagram showing interconnections between various components and subsystems of the present disclosure.

According to one aspect of the present specification, there is disclosed a direct memory access (DMA) engine comprising logic configured to receive a DMA request directed to a memory block; start a DMA transfer; and as the DMA transfer progresses, update guards associated with portions of the memory block for which the DMA transfer is complete.

According to another aspect of the present specification, a processor comprising circuitry to provide a memory instruction directed to a memory block, the instruction configured to test a guard associated with the memory block; if the guard is set, stall the instruction; and if the guard is not set: identify a free DMA channel; and send a DMA request for the memory block to a DMA engine.

According to yet another aspect of the present specification, there is disclosed A computer-implemented method comprising receiving a memory access request directed to an addressed memory region; setting at least one guard on the memory region; identifying a free memory channel to service the memory access request; initiating a data transfer to service the memory access request; and after completing at least a portion of the data transfer, releasing the guard associated with the completed portion.

Detailed Description of Example Embodiments

Processors, including for example central processing units (CPUs) and digital signal processors (DSPs), continue to increase in speed and complexity at a rate greater than memory technologies. Because increased abilities also mean that processor can handle more data in a single time increment, the apparent divergence of processor speed versus memory speed is further exacerbated. This may become a limiting factor in the number of useful operations per second (OPS) performed. For example, if a fast processor relies on a slow memory, it may spend most of its time idle, waiting for data operands to be written into registers, or for old computation results to be written out from registers. Additionally, memory that runs at or near the speed of the processor may be orders of magnitude more expensive than memory that is slow relative to the processor.

A solution is to provide one or more levels of local, on-chip or near-chip memory such as cache or local L1 memory. Local memory runs at or near the speed of the processor, and thus can provide data nearly instantly from the processor's perspective. Cache holds copies of data that have a home location in slower main memory, and provides a table to track the data currently in local memory and their consistency with the same data in main memory. Thus, the processor may address a datum by its main memory address, but may receive a copy from local memory if a copy is stored there. In some embodiments, local L1 memory may be directly addressable.

Another aspect of memory architecture that affects performance is data placement. The paths between memory and the processor can be implemented more efficiently if there are restrictions on how data move across them. For example, each processing element of a vector processor might be restricted to accessing only certain data, such as those with a particular address alignment. Therefore, algorithms may be more efficient if data are arranged in a particular way, which may not be a simple linear block.

The task of selecting data for loading into the cache or local memory may be handled by separate hardware, which employs certain known algorithms to select memory to preload, often fetching large contiguous blocks of memory, as it is common to operate on contiguous blocks. However, in the case of a cache "miss," where the requested data are not already pre-fetched into cache, the processor "stalls," sometimes for as many as tens or hundreds of clock cycles, while useful data are fetched from main memory.

For example, a datum that was recently accessed is likely to be required again soon (temporal locality), and the likelihood of a required datum being in the cache is increased by heuristics to fetch items that have not yet been accessed, such as fetching items adjacent to those requested (spatial locality), and analysis of access patterns to predict the subsequent accesses.

In some cases, a programmer may remain agnostic of the operation of cache. The programmer merely addresses data according to their main memory address, and movement of data into and out of main memory is managed entirely by hardware. However, in some cases, cache space will be wasted on useless data, and some cache misses are inevitable, resulting in processor stalls. Non-explicit cache controllers also do not address the issue of non-linear data placement.

An alternative approach is to make both the fast and slow memory directly addressable and to explicitly program a direct memory access (DMA) controller to transfer data. A programmer with knowledge of the algorithm can ensure that only useful data are loaded into local memory, and that useful data are available when required. Some DMA controllers may also be programmed to reorganize data after they are moved, to address the data placement issue.

Non-cache or cache-plus-L1 memory processors may rely on DMA engines to efficiently copy data into or out of the processor's memory. Some DMA architectures are not synchronized (or at most, are loosely coupled) to processor instruction execution, and are therefore difficult to program so that data arrive (or are written out) just in time. Since DMA engines are effectively separate processors operating in parallel with the core, data movement may be arranged to avoid overwriting memory required by the core before it has used it, and vice versa.

Another class of processors called wide vector processors may execute most efficiently in statically scheduled, predictably looping code, which may efficiently consume and produce long, contiguous vectors. Unlike general-purpose PCs, vector processors are often programmed to do only a small set of fixed, repetitive tasks. Instead of or in addition to traditional cache, vector processors may rely on local "L1" memory. Data buffers for vector processors also may not be organized in contiguous vectors outside of L1 memory.

According to certain aspects of the present disclosure, an explicit pre-fetch mechanism may be programmed by a user or a compiler. In particular, one embodiment of the present disclosure provides a processor architecture and a method for minimizing worst-case latency through an explicitly programmable, asynchronous, DMA-based data pre-fetcher, facilitating instruction-based methods of programming the DMA controller, and synchronizing DMA transfers with the core. Additionally, the disclosed DMA controller can have sufficient addressing complexity to enable efficient mapping from non-unity strided memory to the local L1 memory of the processor.

Further, according to certain aspects of the present disclosure, a processor architecture facilitates synchronizing DMA data movement with a processing core. For example, as further described below, a method for providing explicit, synchronized data pre-load/post-store to an instruction level processor is disclosed, and may be embodied in a "primitive." A primitive in this context means a basic or primitive operation that may be used to build higher-level operations in conjunction with other primitives or higher-level operations, and may be, by way of non-limiting example, a user-accessible hardware instruction, a non-user-accessible operation performed as part of another hardware instruction, a user-accessible software procedure, or a non-user-accessible software procedure performed as part of a different user-accessible software procedure. The method can be accomplished by dedicating one or more DMA channels to support a processor level memory, such as L1 memory. In an example embodiment, the DMA channels share hardware interlocks with the processor load/store unit and share substantial hardware with a data caches. One or more processor instructions may provide efficient communication to the DMA channels. Further, specifically for vector processing, DMA channels may map complex, even non-unity stride/scatter-gather addressing patterns to/from a continuous vector buffer region in the processor's L1 memory. In particular, as further described below, the present disclosure provides for certain example embodiments, including by way of non-limiting example:

a. A MEMCPY primitive that executes synchronously with the core that simply issues a memory request to be completed asynchronously;

b. Guard bits on memory (for example, on L1 memory), or other alternative guards such as comparators;

c. Processor read or write operations stall when guard bits are set;

d. A MEMCPY primitive setting or clearing guard bits;

e. Asynchronous memory transfer setting or clearing guard bits when location is read or written;

f. MEMCPY-type primitives with striding patterns (i.e., two-dimensional (2d) DMA); and g. MEMCPY-type primitives without striding patterns (i.e., one-dimensional (1d) DMA), Turning now to the attached figures, FIG. 1 is a block diagram of a digital signal processing system 100 according to an example embodiment of the present disclosure. In FIG. 1, a system bus 220 arbitrates communication between several subsystems including for example a core 300, local L1 memory 120, DMA engine 212, main memory 320, and I/O devices 310. DMA engine 212 is configured to transfer data (such as operands) from main memory 320 (or some other I/O device 310) to L1 memory 120. Core 300 operates on these data to produce results in L1 memory 120, and then DMA engine 212 transfers the results to main memory 320 or I/O devices 310.

Figure 2:
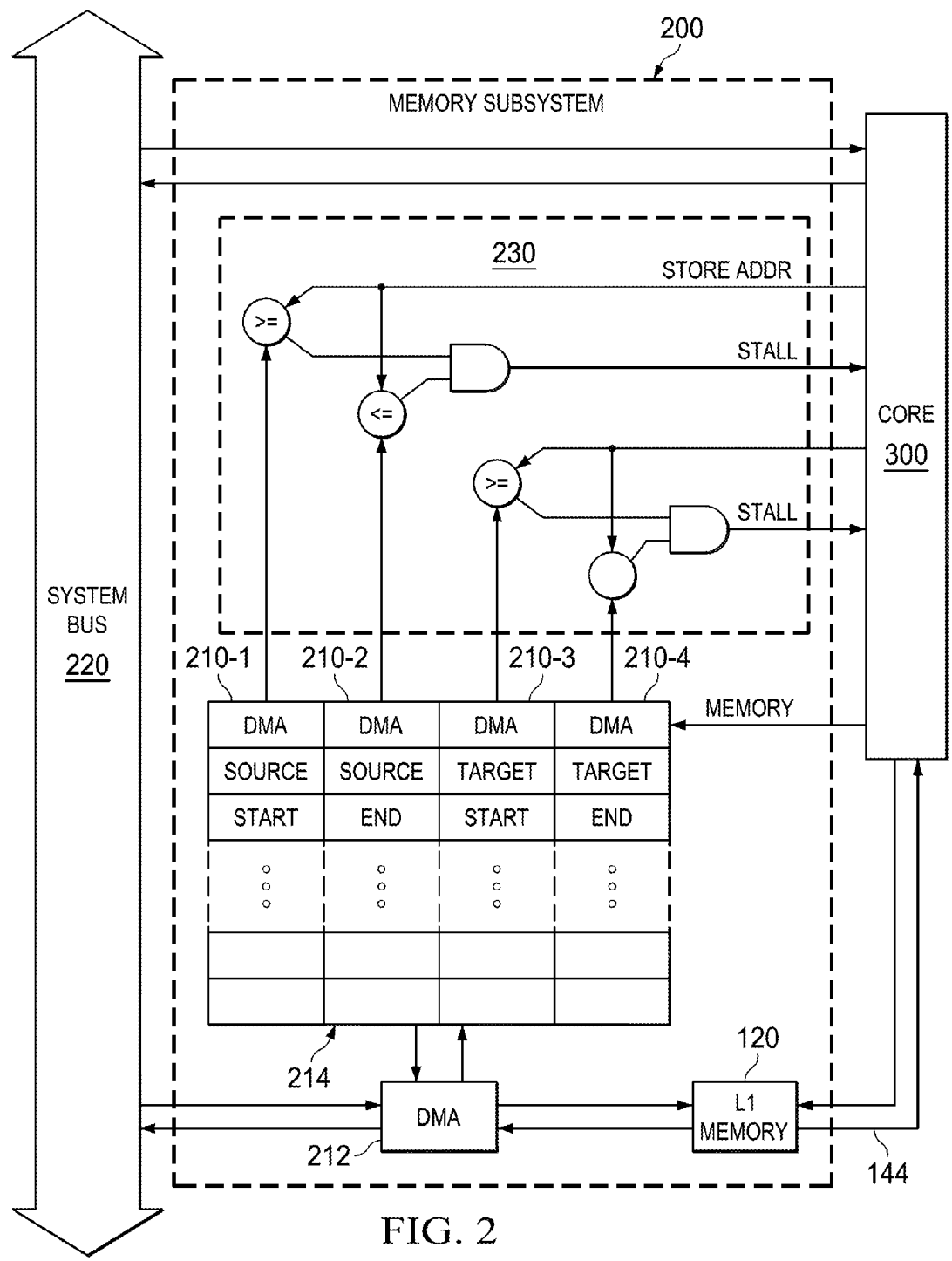
FIG. 2 is a block diagram of an example memory subsystem according to various aspects of the present disclosure.

FIG. 2 is a schematic block diagram of a memory subsystem 200 according to various aspects of the present disclosure. Memory subsystem 200 communicates with core 300, which may include one or more processing elements, and with system bus 220. Memory subsystem 200 includes local L1 memory 120, DMA engine 212 including DMA channels 210, and in some embodiments may be a DMA engine dedicated specifically to servicing processing elements PE of compute array 130 (FIG. 3), or may include DMA channels specifically dedicated to the same. Memory subsystem 200 may interconnect with input/output (I/O) devices 310, other devices, or combinations thereof via system bus 220. Local L1 memory 120 may be a fast, small memory that in some embodiments is integrated with compute array 130 on a single chip, while main memory 320 (FIG. 1) may be a larger, relatively slow off-chip memory. Those having skill in the art will recognize, however, that other combinations and configurations of memory are known and commonly used.

DMA engine 212 is provided to directly transfer data between various devices of digital signal processing system 100 (FIG. 1). In one embodiment, L1 memory 120 and main memory 320 (FIG. 1) are both directly addressable, such that a programmer can explicitly program DMA engine 212 to transfer data between system components.

In an example embodiment, DMA engine 212 has access to a plurality of DMA channels 210. In operation, an example MEMCPY primitive as further described below issues a DMA request, and DMA engine 212 looks for a free DMA channel 210. If no channels are free, DMA engine 212 provides a "DMA block" signal to warn core 300 (FIG. 3) that no DMA channels are available. Once a channel becomes available, DMA engine 212 provides a "DMA unblock." To provide a DMA request, for example as part of a MEMCPY primitive, core 300 may write a source start address, a target start address, a source end address, and a target end address to the channel's registers 214, and then terminate the primitive.

DMA engine 212 services active DMA channels 210 in a round robin fashion, performing a single transfer from the source start address and then incrementing the addresses in the start registers before moving on to the next channel. Once a start address is incremented beyond the corresponding end address, the DMA channel is freed for reuse by a later MEMCPY primitive. In other embodiments, other methods of arbitrating between channels may be used, such as servicing the channel which completed its transfer longest ago or randomly selecting a channel.

An example guard mechanism may be provided by comparators 230. For example, when core 300 executes a LOAD instruction, its address is compared with all the target start and end addresses, and if it falls in any of the ranges, the load is stalled until the start address has been incremented past the LOAD instruction's address. Similarly, STORE instructions are stalled while their addresses fall within any of the source ranges.

Figure 3:
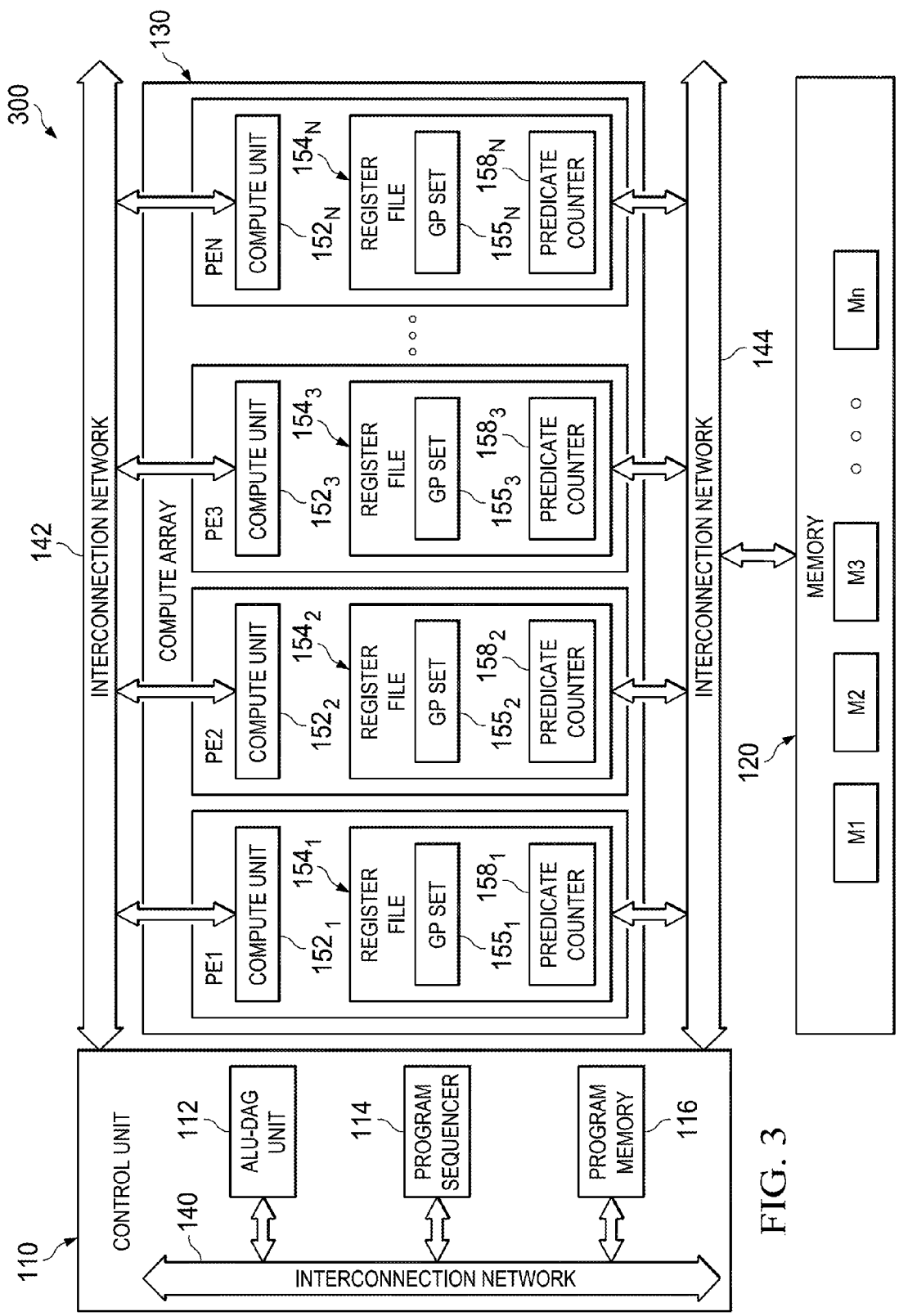
FIG. 3 is a schematic block diagram of a processor system according to various aspects of the present disclosure.

FIG. 3 is a schematic block diagram of an example digital signal processor (DSP) core 300 according to various aspects of the present disclosure, showing L1 memory 120 in situ with core 300. FIG. 1 has been simplified for the sake of clarity and to better understand some of the novel concepts of the present disclosure. Additional features may be added to 300 or to DSP system 100 overall, and some of the features described below may be replaced or eliminated in other embodiments of DSP 300. Furthermore, DSP system 100 is provided as only one example embodiment of a processor that may benefit from the present disclosure. Other types of processors, including central processing units and other programmable devices may be used, and in a general sense, the disclosure of this specification may be used in connection with any machine meeting the well-known von Neuman architecture.

Core 300 may include a control unit 110 and a compute array 130 communicatively coupled to L1 memory 120 via interconnection network 144. In an example, compute array 130 includes a plurality of processing elements PE that can perform computation and data processing functions. Some embodiments of core 300 may include other components, such as a microcontroller for executing microcontroller instructions, a direct memory access (DMA) unit, and various interfaces to off-chip devices. Further, although memory 120 is shown here as a single logical block of L1 memory, those with skill in the art will recognize that memory 120 may include system main memory, various levels of on-chip cache, and/or other volatile or non-volatile memory technologies. For purposes of this example embodiment, memory 120 is treated as a non-cache local L1 memory, while main memory 320 is treated as relatively slower main system memory.

Control unit 110 facilitates program execution on core 300. Control unit 110 may include an arithmetic logic unit and data address generation (ALU-DAG) unit 112, a program sequencer 114, and a program memory 116. Control unit 110 may also include other components, such as an instruction cache, a timer, and an instruction register. ALU-DAG unit 112 supports general purpose integer computations and supplies addresses for memory addresses. For example, ALU-DAG 112 provides memory addresses when data is transferred between L1 memory 120 and registers (such as register files of compute array 130, described below). ALU-DAG unit 112 can supply addresses to data memory (for example, L1 memory 120, or main memory 320) and/or program memory 116. Program sequencer 114 provides instruction addresses to program memory 116 for instruction fetches. Program memory 116 stores programs that core 300 implements to process data (such as that stored in memory 120) and can also store process data. Programs include instruction sets having one or more instructions, and core 300 implements the programs by fetching the instructions, decoding the instructions, and executing the instructions. In an example, programs may include instruction sets for implementing various DSP algorithms.

L1 memory 120 stores information/data to be processed by core 300 (data memory), programs implemented by core 300 to process the information/data (program memory), or a combination thereof. In the depicted embodiment, L1 memory 120 has a multi-banked interleaved memory structure, such that the memory 120 includes memory banks M1, M2, M3, ... Mn, where n is a total number of memory banks of L1 memory 120. In an example, L1 memory 120 is a random access memory, such as a static random-access memory (SRAM), dynamic RAM (DRAM), flash or other suitable memory technology. In an example, one or more memory banks M are a separate RAM. Alternatively, in various implementations, L1 memory 120 is another suitable type of memory.

Interconnection networks 140, 142, and 144 interconnect control unit 110, L1 memory 120, and compute array 130, thereby providing communication pathways between control unit 110, memory 120, and compute array 130. Interconnection network 140, interconnection network 142, and interconnection network 144 may include a single bus, multiple buses, a crossbar network, a single-stage network, a multistage network, other type of interconnection network, or combination thereof. Control unit 110 issues instructions and data addresses to compute array 130 via interconnection network 142. Interconnection network 142 thus transfers addresses for instructions and data to various processing elements PE of compute array 130 via interconnection network 142. Interconnection network 144 transfers data and/or instructions from memory (such as L1 memory 120, program memory 116, other memory, or a combination thereof), such that contents of any register in core 300 can be transferred to any other register or to any memory location and memory 120 can provide data operands (values) to compute array.

In some embodiments, compute array 130 includes a plurality of processing elements PE1, PE2, PE3, ... PEN, where N is a total number of processing elements of compute array. In an example, compute array 110 may include four processing elements (PE1, PE2, PE3, and PE4). Processing elements PE perform numeric processing for DSP algorithms. Processing elements PE may operate independently, in parallel, or as a SIMD engine. In the present example, each processing element PE may be a vector processor. Alternatively, processing elements PE may be a combination of scalar processors and vector processors.

Processing elements PE each include a respective computation unit (CU) 152. In the depicted embodiment, computation units 152 may be identical, although the present disclosure contemplates embodiments where computation units 152 are not identical. The present disclosure further contemplates configurations where one or more processing elements PE do not include a computation unit 152. In the present example, computation units 152 each include an arithmetic logic unit (ALU), a multiplier-accumulator (MAC), a shifter, other computational unit, or combinations thereof. An ALU can perform arithmetic and logic operations, such as add, subtract, negate, increment, decrement, absolute value, AND, OR, EXCLUSIVE OR, NOT, divide primitive, other arithmetic operations, other logic operations, or combinations thereof. An example MAC can perform multiplication operations as well as multiply and accumulate operations, such as single-cycle multiply, multiply/add, multiply/subtract, other operations, or combinations thereof. A shifter can perform logical and arithmetic shifts, bit manipulations, normalization, denormalization, derive-exponent operations, other operations, or combinations thereof. The various arithmetic operations, logic operations, and other operations can be performed on both fixed-point and floating-point formats. In various embodiments, the ALU, MAC, and/or shifter include registers associated therewith.

Processing elements PE may also each include a respective register file 154. In the depicted embodiment, register files 154 may be identical, although the present disclosure contemplates embodiments where register files 154 are not identical. The present disclosure further contemplates configurations where one or more processing elements PE do not include a register file 154. Register files 154 include registers that transfer data between processing elements PE and data interconnection networks (such as interconnection network 144) and stores results. In the present example, register files 154 can include a respective general purpose register set 155 that include general purpose registers having widths dependent on design requirements of core 300, such as 32-bit general purposes registers, 40-bit general purpose registers, 64-bit general purpose registers, 128-bit general purposes registers, other width general purpose registers, or a combination thereof. For purposes of the following discussion, general purpose registers 155 include 32-bit general purpose registers.

Core 300 may be configured to perform various parallel operations. For example, during a single cycle, processing elements PE may access an instruction (via interconnection network 142) and access N data operands from memory (via interconnection network 144) for synchronous processing. In SIMD mode, core 300 may process multiple data streams in parallel. For example, when in SIMD mode, core 300 in a single cycle may dispatch a single instruction to each or a plurality of processing elements PE via interconnection network 142; load N data sets from memory (memory 120, program memory 116, other memory, or combination thereof) via interconnection network 144, one data set for each processing element PE (in an example, each data set may include two data operands); execute the single instruction synchronously in processing elements PE; and store data results from the synchronous execution in memory 120.

Figure 4:
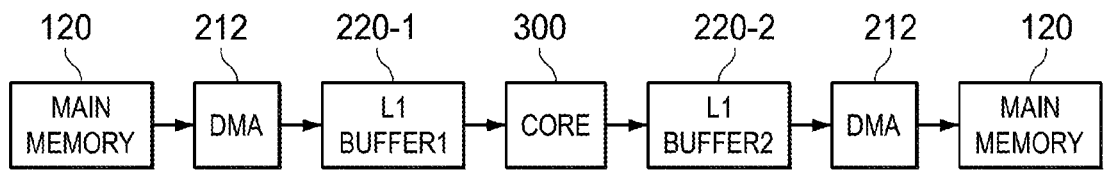
FIG. 4 is a block diagram illustrating an example data flow resulting from the operation of the processor system of FIG. 1 according to various aspects of the present disclosure.

FIG. 4 illustrates an example data flow that can result during operation of core 300 according to various aspects of the present disclosure. This operation can be optimized by allocating multiple buffers in L1 memory 120 so that DMA engine 212 transfers and core operations may happen in parallel, where L1 memory 120 includes multiple buffers (for example, four buffers (buffer 1, buffer 2, buffer 3, and buffer 4), as shown in FIG. 5). The block diagram of FIG. 4 shows the overall data flow, wherein DMA engine 212 transfers data directly from main memory 120 into L1 buffer1 120-1. Simultaneously, DMA engine 212 may be able to handle a write from L1 memory buffer 120-2 into main memory 120.

For example, as seen in FIG. 5, in a first time period $t_1$, core 300 can read data (operands) from buffer 510-1 and write results to buffer 510-2 while a DMA buffer 210-1 transfers results (previously computed by core 300) from buffer3 510-3 and another DMA buffer 210-2 transfers future data (for computation by core 300) into buffer4 510-4 (FIG. 5). This is shown by the following pseudocode:

```
for (time t1){
    buffer_1(operands) → core(results) → buffer_2;
    buffer3(previous results) → DMA_engine_1 →
main_memory;
        main_memory(future operands) → DMA_engine_2 →
buffer_4);
}
```

Once these activities are complete, the buffers may be switched and the process started again. For example:

```
for (time t2){
    buffer_4(operands) → core(results) → buffer_1;
    buffer2(previous results) → DMA_engine_1 →
main_memory;
        main_memory(future operands) → DMA_engine_2 →
buffer_3);
}
```

During a third time period, the buffers may be switched again, as follows:

```
for (time t3){
    buffer_3(operands) → core(results) → buffer_4;
    buffer_1(previous results) → DMA_engine_1 →
main_memory;
        main_memory(future data) → DMA_engine_2 → buffer_2);
}
```

One difficulty in programming this parallel activity is synchronizing between core 300 and DMA buffers 210. To address this difficulty, DMA engine 212 may be explicitly coded to ensure that data written by DMA engine 212 are available before core 300 tries to read them and that data written by core 300 are available before DMA engine 212 tries to read them. A talented programmer could theoretically predict the maximum and minimum times it takes for each to process a fixed amount of data and arrange sufficient delay between the two to ensure that the reader does not catch up with the writer. However, as systems evolve, the assumptions that the original calculations were based on may become invalid.

Figure 6:
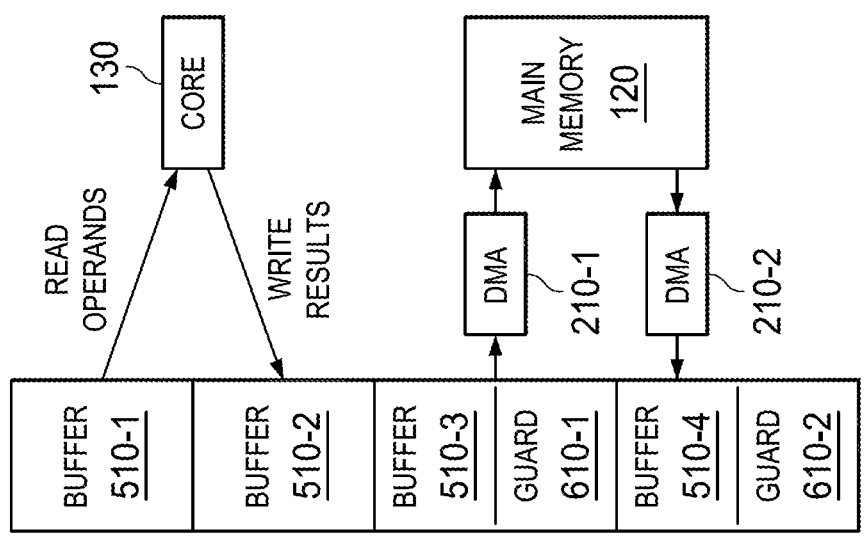
FIG. 6 is a block diagram of guarded buffers according to various aspects of the present disclosure.

As shown in FIG. 6, one example method to ensure memory buffer availability is to implement a software handshake so that both core 300 and DMA engine 212 are aware when one has finished writing so that the other can start reading.

Figure 7:
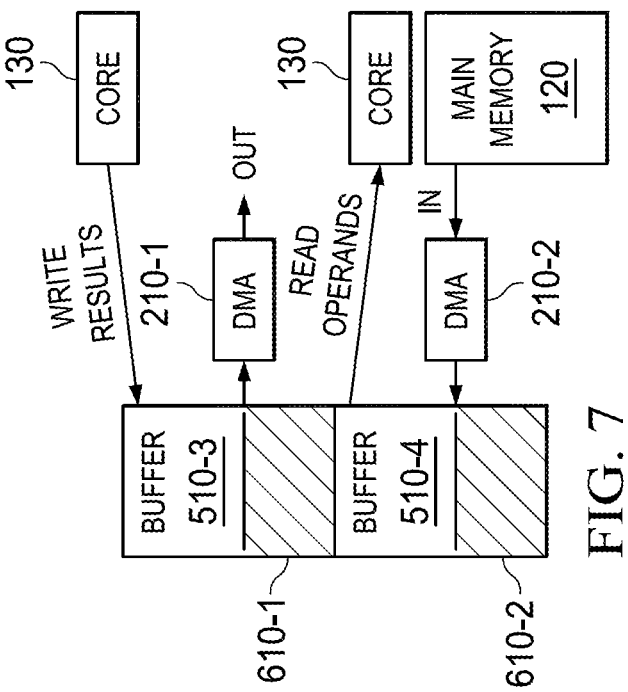
FIG. 7 is an additional block diagram of guarded buffers according to various aspects of the present disclosure.

However, as shown in FIG. 7, an example embodiment of the present disclosure adds guards 610, such as guard bits, comparators, or a similar flagging mechanism, to facilitate synchronization between core 300 and DMA engine 210. This may enable safe memory operation while consuming fewer memory buffers 510 than are required for a software handshake architecture as shown in FIG. 6. Guards 610 prevent core 300 from accessing parts of a memory buffer 510 that DMA engine 212 is using. When a memory operation starts, the entire memory buffer 510 is guarded, and as the transfer progresses, the guarded region is reduced to just that portion of memory buffer 510 left to process. Memory transfers that are guarded may be referred to in some embodiments as "protected transfers."

Thus, according to some embodiments, core 300 and DMA engine 212 may safely use the same buffers 510, as illustrated in FIG. 7. In FIG. 7, core 300 writes results to memory buffer 510-3 while DMA engine 212 transfers the results out to DMA buffer 210-1, and core 300 reads operands from memory buffer 510-4 while DMA engine 212 transfers data in to DMA buffer 210-2.

In one particular embodiment of the present disclosure, a set of guard bits 610 are added to L1 memory 120, such that each guard bit 610 is associated with some number of words of L1 memory 120. Primitives may also be added to initiate bulk data transfers. For example, the present disclosure proposes a "memory copy in" (MEMCPY_IN) primitive that initiates a transfer of a block of data of a specified size from an external address (for example, from main memory 320) to an address in L1 memory 120:

MEMCPY_IN(address_in_L1, external_address, size)

A "memory copy out" (MEMCPY_OUT) primitive is also added to initiate a transfer of a block of data of a specified size from an address in L1 memory 120 to an external address (for example, in main memory 120):

MEMCPY_OUT(address_in_L1, external_address, size)

Those with skill in the art will recognize that a MEMCPY primitive according to the present embodiment need not have the specific name MEMCPY or be identical to the example primitive disclosed herein.

Figure 8:
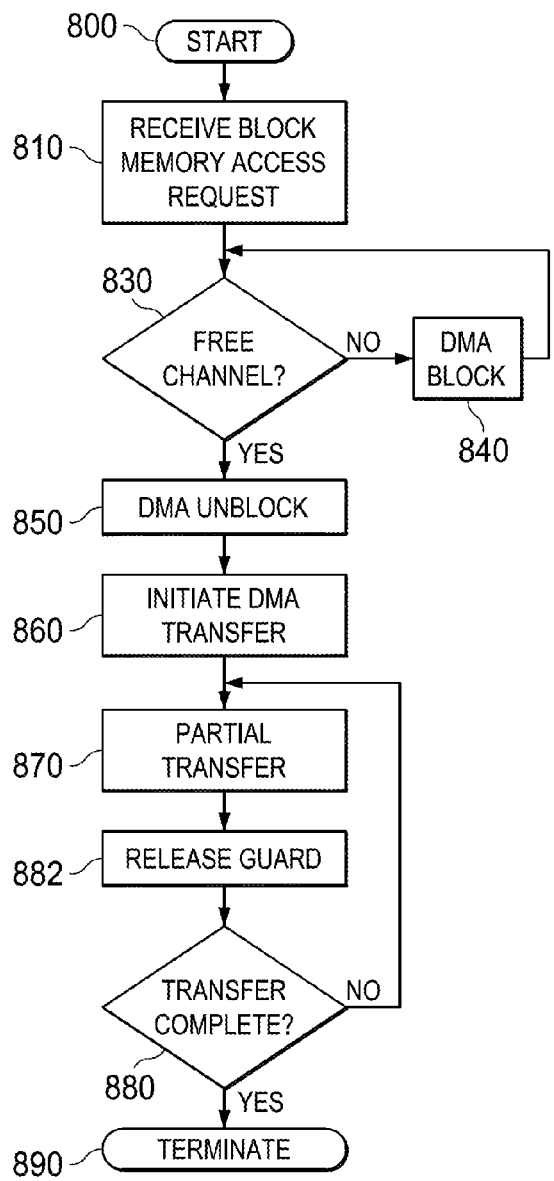
FIG. 8 is a flow chart of an example method performed by a DMA engine according to various aspects of the present disclosure.

FIG. 8 is a flow chart of an example MEMCPY method from the perspective of DMA engine 212. Starting at block 800, DMA engine 212 receives in block 810 a memory access request directed to a memory block, including for example a starting address, a word size or burst size, and a number of words to transfer, all according to methods know in the art. In block 830, DMA engine 212 checks for a free DMA channel 210. If there are no free DMA channels 210, then in block 840, DMA engine 212 sets a DMA block, which informs core 300 that no DMA operations may be started until a DMA channel 210 is clear. Once a free DMA channel is found, in block 850 a DMA unblock is set.

In block 860, DMA engine 212 initiates a DMA transfer, which starts in block 870 with a partial transfer, meaning that the first portion of the requested memory operation is completed. For example if the DMA request is to load four words from memory, DMA engine 212 may finish loading the first word on the first clock cycle. In block 882, DMA engine 212 may then clear any guards associated with the first word, such as a guard bit associated with the first word. Guard bits are used as an example guard mechanism, but any of the guards disclosed in this specification may be used, and those with skill in the art will recognize other possible guard mechanisms. Furthermore, although this embodiment "clears" the guard, those with skill in the art will recognize that a guard may be updated in various ways that indicate that the memory region has become available.

After clearing the guard bit, in decision block 880, DMA engine 212 checks whether the full block memory access has been completed. If it is incomplete, the method returns to block 870 to transfer the next portion of the requested memory. If it is complete, then in block 890, the DMA terminates.

Figure 9:
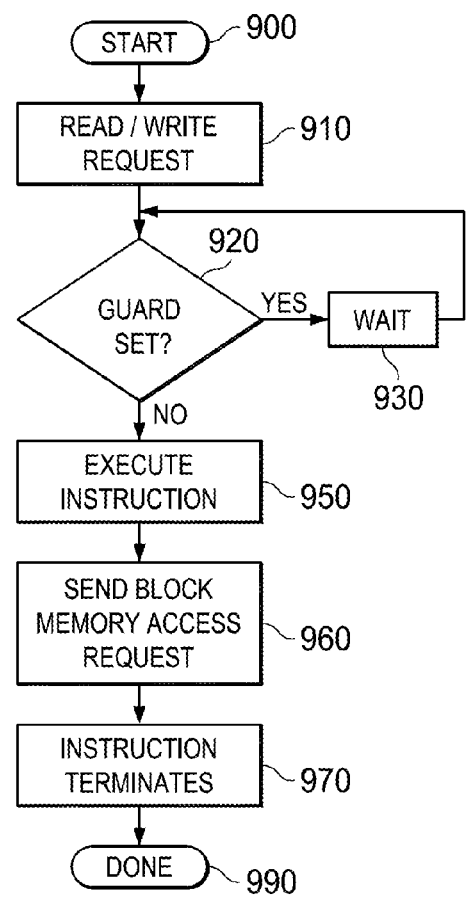
FIG. 9 is a block diagram of an example hardware instruction according to various aspects of the present disclosure.

FIG. 9 is a flow chart of an example method for performing memory load and store operations from the perspective of core 300. The method may be performed while DMA engine 212 continues to service previous memory requests, and may be performed as part of a MEMCPY primitive or in conjunction with a MEMCPY primitive. It is expressly intended that certain operations be considered together, even if core 300 is configured to treat them as separate instructions or primitives. For example, core 300 may provide a separate MEMCPY primitive to separately set guard bits as discussed above, while the load and store primitives are provided separately. However, in an alternative embodiment, the load and store primitives themselves may be configured to set guard bits without substantially altering the spirit of the method disclosed here.

Starting in block 900, core 300 issues in block 910 a read ("load") or write ("store") access request. In block 920, core 300 checks to see whether there is a guard set over the requested memory block. If all or part of the requested block is guarded, then the MEMCPY instruction stalls and in block 930 enters a wait state. Once guard bits for the requested memory region are cleared, then in block 960, core 300 issues a block memory access request, which may be directed to DMA engine 212. After issuing the DMA request, in block 970, the MEMCPY primitive may terminate without waiting for DMA engine 212 to complete the memory operation.

Yet other embodiments of a MEMCPY primitive may have additional parameters, for example, specifying strides through external or internal memory in the manner of a two-dimensional DMA.

Alternative methods of guarding may also be provided in other embodiments. For example, upon an access request from core 300, the requested address may be compared directly with the bounds of active MEMCPY operations using comparators, as seen in FIG. 2. This method limits the MEMCPY primitives to simple block data operations, but also involves less delay at the initiation stage. It also may allow regions outside L1 memory 120 to be guarded.

In yet another embodiment, readers are caused to stall via a standard hardware handshake protocol used to ensure the integrity of data transfers to fast memory. For instance a DMA controller 212 reading L1 memory 120 via an Advanced Extensible Interface (AXI) slave port may be stalled by a potentially long delay between the slave asserting ARREADY, to indicate the address has been accepted, and asserting RVALID, to indicate data are available.

It may not be acceptable to stall DMA engine 120 (or core 300). So according to another embodiment of the present invention, a hardware flag generates interrupts to DMA engine 212 upon a VSTORE event, which initiates a memory transaction instead of blindly initiating the transfer and stalling, as in FIG. 9. On the processor side, the flag state transition may initiate a fast thread swap (in the case of a hardware-threaded processor). This embodiment requires a mechanism to map valid bits to DMA channel 210 interrupts, if multiple DMA channels 210 are allowed.

According to certain embodiments of the present disclosures, as readers and writers of vector buffers are automatically kept synchronized, programmers may introduce DMA into their application incrementally. For instance, buffers could be allocated just for the duration of loops with alignment constraints while an application is being developed, and only once it is working have their lifetimes adjusted to maximize the concurrent operation of core 300 and DMA engine 212. Even after an application has been tuned guard bits 610 ensure correct operation should a reader catch up with a writer under extraordinary system conditions.

According to various embodiments of the present disclosure, the MEMCPY primitive may be implemented in software and accessed via an API, or in hardware and accessed via hardware instructions.

In another example embodiment of the present disclosure, a MEMZERO primitive is also added, which zeroes out the destination range.

In yet another example embodiment of the present disclosure, a hardware queue is added for protected transfers so that several protected transfers can be queued, and each will finish in first-in-first-out (FIFO) order. If a MEMCPY is issued when the queue is full, it will be stalled.

If an interrupt happens during the stall, the MEMCPY primitive could stall for an unacceptably long time if it is waiting for a previous MEMCPY primitive to finish. So as not to delay interrupts indefinitely, in an example embodiment, the MEMCPY primitive is configured to handle interrupts. In particular, because the MEMCPY primitive did not start execution, the interrupt mechanism will return to and re-execute the MEMCPY primitive, after interrupt processing completes.

In yet another example embodiment, when the queue is empty, the MEMCPY primitive may assert an interrupt bit. The interrupt bit may be masked so that no interrupt actually happens. A WAIT instruction may also be added to stall until a particular interrupt bit is asserted. This can be pre-empted by other un-masked interrupts, but after interrupt processing complete, it will return to the WAIT. Only the specified interrupt will cause the WAIT instruction to complete.

In yet another example embodiment, a timeout counter control register is added so that bad transfers do not cause infinite waits. This example register may only count when a WAIT instruction is active. After a certain threshold time, for example 3,000 cycles, the register may be configured to force the WAIT to its off state.

In yet another example embodiment, WAIT may be implemented with "valid" or "dirty" bits protecting buffers 510 in L1 cache 120. The dirty bit may be set whenever data is written into a buffer 510 to indicate that the buffer 510 has been modified. After queuing its DMA request, an example MEMCPY primitive may also mark the target buffer 510 as invalid or "dirty." Once DMA engine 212 moves data into or out of a part of buffer 510, it marks buffer 510 as valid or "clean."

In yet another example embodiment, MEMCPY primitives and DMA transfers may be configured to operate in cacheable memory regions. This may require, for example, interacting with a cache controller to gain ownership of one or more cache lines. Guard bits may then be synthesized for synchronizing core 300 and DMA engine 212 from the "standard" valid and dirty bits of the writeback cache controller. The standard bits may have definitions including:
  a. Invalid: the line is not logically in the cache. A read (by either DMA engine 212 or core 300) should stall until the line is marked valid.
  b. Valid: Data are ready to be read, and the line does not need to be written back to memory.

Both the valid and dirty states imply that the line cannot be "dropped." It should be written back to main memory before changing state.

If DMA engine 212 is moving data to the cache memory, i.e., writing to the buffer, it should interact with the cache controller to prevent the controller from inadvertently attempting a line fill if core 300 attempts to access the memory address first, for example through a load instruction. The valid bit may be set after a DMA write to the cache line portion of a buffer has completed (thus resolving the stall condition, such that a load instruction to that cache line region will progress).

If DMA engine 212 is moving data from cache to main memory 320, it may need to communicate with the cache controller to take control of the lines that map to the buffer. DMA engine 212 may then wait for each cache line of the buffer region to be marked both valid and dirty, as set by the cache control logic after write operations from core 300. DMA engine 212 may then clear the valid and dirty bits after the DMA writes from cache to main memory 320 are complete.

According to yet another embodiment, both L1 cache accesses and core reads of invalid data stall until the valid bit is set. Writes to dirty regions are also delayed until DMA engine 212 has marked them clean. Advantageously, the use of dirty bits enables a MEMCPY primitive that has the same semantics as the standard C "memcpy( )" call, so code may be written in a portable fashion.

In yet another embodiment, a double-buffered routine in L1 memory is represented by the code below, where there is one input buffer (dram_buffer0) and one output buffer (dram_buffer1), where a and b are the two buffers in L1 memory. This code does at least three passes, where the first prefetches the input, the middles do the work, and the last saves the final output.

```
// Size of L1 buffers
width0a = width0b = sizeof (buffer0a);
width1a = width1b = sizeof (buffer1a);
pass = 1; // = 1 for first, 0 for middle, and −1 for last
pass
while (pass >= 0) {
  if (pass <= 0) { # put output
  if (width1a >= width1) {
    // Write tail end of array
    width1a = width1;
    pass--; // Transition to −1, last pass
  }
  MEMCPY (buffer1a, dram_buffer1, width1a);
  width1 -= width1a;
  dram_buffer1 += width1a; swap (buffer1a, buffer1b); swap (width1a, width1b);
  }
  if (pass >= 0) { # get input
  if (width0a >= width0) {
    // Read tail end of array
    width0a = width0;
  }
  MEMCPY (dram_buffer0, buffer0a, width0a);
  width0 -= width0a;
  dram_buffer0 += width0a; swap (buffer0a, buffer0b); swap (width0a, width0b);
  pass -= pass; // transition from 1 to 0
  }
  if (pass == 0) { // do work
    kernel (buffer1a, buffer0a, width0a); // run some kernel
  on these buffers
  }
  WAIT (memcpy_queue_empty); // Stall to let new data come
  in and the last old data go out
}
```

This whole sequence may be provided as a macro, or the kernel routine can be marked as in-lined.

The present disclosure further contemplates the following for maximizing the memory bandwidth for streaming kernels. A two-dimensional MEMCPY primitive may be provided. This version of the primitive may receive three additional parameters: source line stride, destination line stride, and row count. In this case, a single primitive may require up to six operands total.

In some example embodiments, an application programming interface (API) is provided for a vector buffer. For example:

```
VBuf *vbuf(const void *external_address, size_t count,
    size_t stride, size_t elsize);
VBuf *vbuf2d(const void *external_address, size_t ycount,
    size_t ystride, size_t xcount, size_t xstride, size_t
    elsize);
```

Wherein, *vbuf allocates a buffer of count*elsize, and *vbuf2d allocates a buffer of ycount*xcount*elsize bytes.

This case may use the cache line valid bit granularity, even though non-unity stride does not map to a contiguous cache line region.

A more general API may fully specify slow and fast (external/internal), direct memory accesses (start address, count, stride, elsize) independently. This may use elsize-granularity valid bits.

DMA may also have its own (or walk the processor's) page table to find the virtual to physical mapping, though in some cases this may require more cycles and more hardware.

In yet another embodiment, a method may be provided to return a vector buffer handle for use in other API calls, as follows.

void *vload(VBuf *);

In one example, this method may invalidate any buffer previously associated with VBuf, start a DMA transfer into the buffer using parameters from VBuf, and return a pointer to start of the vector buffer.

In yet another embodiment, a method may be provided to initiate a vector store operation as follows.

void *vstore(VBuf *);

In one example, this method invalidates any buffer previously associated with VBuf, starts a DMA transfer from the buffer, which stalls until data become available (or generates a first DMA interrupt after the first valid bit set), and returns a pointer to the start of the vector buffer.

In yet another embodiment, a method is provided to release a pointer to a vector bugger as follows.

void vrelease(VBuf *);

In one example, this method waits until any outstanding DMA transfers are complete, and releases the buffer and all associated resources.

The API may also include routines to provide finer grained control of buffer states, as follows.

```
void vinvalidate(VBuf *); /* invalidate buffer */
void vsend(VBuf *);   /* start DMA transfer from buffer */
void vreceive(VBuf *);  /* start DMA transfer to buffer */
```

An example of use with local allocation of buffers includes:

```
VBuf *xb = vbuf(x, 1024, 4, sizeof(x[0]));
VBuf *yb = vbuf(y, 1024, 1, sizeof(y[0]));
float *xp = vload(xb);
```

```
float *yp = vstore(yb);
for (i = 0; i < 1024; ++i)
    yp[i] = xp[i] * xp[i];
vrelease(xb);
vrelease(yb);
```

Later the data movement can be optimized by hoisting the vbuf and vload calls higher above the loop and sinking the vrelease further below the loop.

In yet another example embodiment, valid bits may be used to enable readers and writers to access the same buffer concurrently, which may improve the performance of the application by reducing the time spent waiting for one to complete. However to avoid race conditions the valid bits themselves should be set to their invalid state before a DMA transfer is initiated.

The number of valid bits that need to be written can be reduced by increasing the number of data bytes each bit describes. However, this also reduces the options for buffer size and alignment. One example solution is to set a data width similar to cache line length, for example between 32 and 128 bytes. The number of valid bits that can be written in parallel can be increased by packing them into the same sub-bank of physical memory.

In yet another embodiment, core 300 waits until valid bits are set without disabling interrupts by employing two instructions. The first instruction starts a state machine that runs asynchronously to the processing element PE that set the bit. The second instruction, which is interruptible, waits for the state machine to complete.

An API, such as the one outlined above, may use a small number of DMA channels for a larger numbers of buffers. This can be achieved with a descriptor-based DMA controller 212, by linking a descriptor for each transaction into the list that is being processed by DMA controller 212. To ensure transfers into buffers are not stalled behind transfers out of buffers separate channels should be used for each direction.

Some DSPs have L1 memory 220 that may be configured as cache, so cache tags containing valid bits are already present. A combined scheme that allows parts of L1 to be used as vector buffers according to the present disclosure, and parts to be used as cache might reuse the same valid bits for both purposes.

In the discussions of the embodiments above, any capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES, EXAMPLES, AND IMPLEMENTATIONS

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A direct memory access (DMA) engine comprising logic configured to:
    receive a DMA request directed to a memory block of size k, comprising n portions of substantially equal size;
    transfer a portion of the memory block of size k/n; and
    clear a guard associated only with the portion of the memory block.

2. The DMA engine of claim 1, wherein the logic is further configured to:
    after receiving the DMA request:
    provide a DMA block signal;
    identify a free DMA channel; and
    after identifying the free DMA channel, provide a DMA unblock signal associated with the free DMA channel.

3. The DMA engine of claim 1, wherein the guard bits also serve as a dirty bit or an invalid bit for a cache memory.

4. The DMA engine of claim 1, wherein updating the guards comprises changing a buffer defining saved bounds of a guarded memory block so that it excludes a portion of memory that has already been transferred.

5. The DMA engine of claim 1 further comprising a queue for handling multiple DMA requests, wherein the queue is operated in a first-in-first-out order.

6. The DMA engine of claim 1 further configured to automatically reorder data comprising a non-unity-stride vector.

7. A processor comprising circuitry to provide a memory instruction directed to a memory block, the instruction configured to:
    test a guard associated with the memory block;
    if the guard is set, stall the instruction; and
    if the guard is not set:
    identify a free DMA channel; and
    send a DMA request for the memory block to a DMA engine.

8. The processor of claim 7, wherein the processor is configured to terminate the instruction upon sending the DMA request.

9. The processor of claim 7, wherein the guard comprises a guard bit.

10. The processor of claim 9, wherein setting the guard comprises setting a plurality of guard bits, wherein each of the guard bits are associated with a portion of the memory block.

11. The processor of claim 7, wherein the guard comprises a buffer identifying an address range for a memory block in use, and wherein testing the guard comprises comparing the requested memory block to the address range for the in-use memory block.

12. The processor of claim 7, wherein setting a guard comprises using a standard hardware handshake protocol.

13. The processor of claim 7, wherein the processor is configured, after initiating the DMA transfer, to:
    not disable interrupts;
    issue a first instruction starting a state machine; and
    issue a second instruction that is interruptible and that waits for the state machine to complete.

14. The processor of claim 7, wherein the memory instruction is a load instruction configured to transfer data from the memory block to the processor.

15. The processor of claim 7, wherein the memory instruction is a store instruction configured to transfer data from the processor to the memory block.

16. A computer-implemented method comprising:
    receiving a memory access request directed to an addressed memory region;
    setting at least one guard on the memory region;
    identifying a free memory channel to service the memory access request;
    initiating a data transfer to service the memory access request; and
    after completing a portion of the data transfer, releasing a guard associated only with the completed portion.

17. The method of claim 16, wherein:
    the guard comprises a memory buffer identifying one or more regions of memory as being in use;
    setting the guard comprises identifying the memory region as being a memory region in use; and
    releasing the guard comprises removing from the memory buffer the portion of the memory region for which the data transfer has been completed.

18. The method of claim 16, further comprising, after initiating the data transfer, terminating an instruction that provided the memory access request.

19. The method of claim 16, wherein setting the guard comprises setting a guard bit, and releasing the guard comprises releasing the guard bit.

20. The method of claim 1, wherein the portion of the memory block is a first portion, and wherein the logic is further configured to:
    transfer a second portion of the memory block of size k/n;
    clear a guard associated only with the second portion of the memory block.

* * * * *